United States Patent [19]

Baker

[11] Patent Number: 4,925,883

[45] Date of Patent: * May 15, 1990

[54] MOLDED VINYL HALIDE RESIN (PVC) FLOORING COMPOSITIONS HAVING REDUCED WATER ABSROPTION

[75] Inventor: Paulette Baker, Chardon, Ohio

[73] Assignee: Synthetic Products Company, Cleveland, Ohio

[ * ] Notice: The portion of the term of this patent subsequent to Mar. 21, 2006 has been disclaimed.

[21] Appl. No.: 357,991

[22] Filed: May 30, 1989

Related U.S. Application Data

[63] Continuation-in-part of Ser. No. 321,505, Mar. 9, 1989, abandoned, which is a continuation of Ser. No. 149,532, Jan. 28, 1988, Pat. No. 4,814,369.

[51] Int. Cl.$^5$ ................................................ C08K 5/09
[52] U.S. Cl. ...................... 524/287; 524/296; 524/387; 524/399; 524/400; 524/914
[58] Field of Search ................ 524/287, 296, 914

[56] References Cited

U.S. PATENT DOCUMENTS

| | | | |
|---|---|---|---|
| 2,542,179 | 10/1947 | Buchanan | 524/287 |
| 4,269,743 | 5/1981 | Hulyalkar et al. | 524/567 |
| 4,269,744 | 5/1981 | Hulyalkar et al. | 524/567 |
| 4,814,369 | 3/1989 | Baker | 524/287 |

FOREIGN PATENT DOCUMENTS

| | | | |
|---|---|---|---|
| 0022349 | 3/1981 | Japan | 524/287 |
| 0659586 | 4/1979 | U.S.S.R. | 524/287 |
| 0678057 | 8/1979 | U.S.S.R. | 524/287 |

Primary Examiner—Joseph L. Schofer
Assistant Examiner—Peter D. Mulcahy
Attorney, Agent, or Firm—Wood, Herron & Evans

[57] ABSTRACT

A vinyl halide resin (PVC) flooring composition having reduced water absorption containing polyhydric alcohol, metal salt stabilizer, filler and an aromatic carboxylic acid such as benzoic, methylbenzoic or naphthoic acid as an anti-water absorption agent. The compositions may be employed for dramatic improvement against swelling and buckling of flooring tile and sheet.

9 Claims, No Drawings

4,925,883

MOLDED VINYL HALIDE RESIN (PVC) FLOORING COMPOSITIONS HAVING REDUCED WATER ABSORPTION

RELATED APPLICATION

This application is a continuation in part of Ser. No. 321,505 filed Mar. 9, 1989, now abandoned, which in turn is a continuation of Ser. No. 149,532 filed Jan. 28, 1988 now U.S. Pat. No. 4,814,369.

BACKGROUND OF THE INVENTION

Polyvinyl chloride (PVC) flooring compositions require a number of important properties in order to be saleable. Excellent color and light stabilities are very important properties. Moreover, degradation by the action of heat during molding is a major problem in the use of PVC or similar vinyl halide resins. Various additives have been proposed as stabilizers to provide color, heat and light stabilities in the manufacture of flooring tile or sheets. It is well known to use stabilizer systems and, in particular, a polyhydric alcohol such as pentaerythritol and a metal salt are known to impart excellent heat and light stabilities to PVC flooring. Unfortunately, pentaerythritol has a high water absorption and the PVC binder for these highly filled flooring compositions is highly water permeable. Absorption of water causes swelling of the installed flooring and swelling is particularly offensive in the case of tile. Tightly fitted tile pieces buckle irreversibly, thereby destroying the appearance and utility of the floor. The problems of swelling and buckling are also found to a lesser extent in continuous PVC flooring sheets. Examples of patent literature on vinyl halide resin stabilizer compositions containing polyols and mixed metal salts include U.S. Pat. Nos. 4,269,743 and 4,269,744 that disclose a polyhydric alcohol such as pentaerythritol in combination with a higher fatty acid salt of calcium/zinc or barium/zinc.

SUMMARY OF THE INVENTION

The present invention is directed to a molded vinyl halide resin flooring composition that has reduced water absorption. It has been found that the water absorption characteristics of a conventionally filled PVC flooring composition having a polyhydric alcohol and metal stabilizer system can be provided with reduced water absorption characteristics by including an aromatic monocarboxylic acid as an anti-water absorption agent in an effective amount. In a filled PVC flooring composition containing pentaerythritol and a mix metal stabilizer such as barium/zinc fatty acid salts, benzoic acid in a minor amount has been found to provide a dramatic improvement in reducing the water absorption characteristics. In fact, in such compositions, the water absorption characteristics have not only been completely obviated, but synergistic improvements have been achieved.

Other aromatic monocarboxylic acids have been found to provide similar results. More specifically, methylbenzoic and naphthoic acids also provide dramatic improvements in reducing water absorption as members of the broader class of aromatic monocarboxylic acids.

DETAILED DESCRIPTION OF THE INVENTION

Molded vinyl halide resin flooring compositions having reduced water absorption, in accordance with the principles of this invention, contain as a major component a vinyl halide resin, principally polymers and copolymers of vinyl chloride such as polyvinyl chloride (PVC) or polyvinyl chloride-vinyl acetate (PVC/VA). PVC polymers may optionally be modified with other resins such as hydrocarbon resins. The flooring compositions usually contain a substantial amount of filler, at least on the order of about 300 parts per 100 parts of polymer. Fillers are selected from the group consisting of limestone (calcium carbonate), clay (kaolinite), talc and the like, in various fine and coarse grades or mixtures. Pigments such as titanium dioxide, plasticizers such as an ester plasticizer, or other processing additives may be included. An excellent stabilizer system includes a polyhydric alcohol, especially pentaerythritol, and a metal salt or mixed salt of a fatty acid of calcium, barium, cadmium and zinc. The anti-water absorption agent is an aromatic monocarboxylic acid, more specifically benzoic, methylbenzoic or naphthoic acid.

Broad ranges of components of the vinyl halide resin flooring compositions may be employed in the invention. Particularly useful compositions of the invention are achieved containing about 0.75 to about 5 parts of the metal salt stabilizer, about 0.5 to about 5 parts of the polyhydric alcohol, about 0 to about 100 parts of the usual plasticizers, at least about 300 parts to about 1000 parts filler and about 0.2 to about 5 parts of the aromatic monocarboxylic acid, optionally modified with hydrocarbon resin in a minor amount on the order of about 10 to about 50 parts and about 0.2 to about 5 parts of melamine, all said parts on the basis of 100 parts of vinyl halide resin.

The vinyl halide resin employed is most commonly a homopolymer of vinyl chloride, i.e., polyvinyl chloride. It is to be understood, however, that this invention is not limited to a particular vinyl halide resin such as polyvinyl chloride or its copolymers. Other halogen-containing resins which are employed and which illustrate the principles of this invention include chlorinated polyethylene, chlorinated polyvinyl chloride, and other vinyl halide resin types. Vinyl halide resin, as understood herein, and as appreciated in the art, is a common term and is adopted to define those resins or polymers usually derived by polymerization or copolymerization of vinyl monomers including vinyl chloride with or without other comonomers such as ethylene, propylene, vinyl acetate, vinyl ethers, vinylidene chloride, methacrylate, acrylates, styrene, etc. A simple case is the conversion of vinyl chloride $H_2C=CHCl$ to polyvinyl chloride $(CH_2CHCl-)_n$ wherein the halogen is bonded to the carbon atoms of the carbon chain of the polymer. Other examples of such vinyl halide resins would include vinylidene chloride polymers, vinyl chloride-vinyl ester copolymers, vinyl chloride-vinyl ether copolymers, vinyl chloride-vinylidene copolymers, vinyl chloride-propylene copolymers, chlorinated polyethylene, and the like. Of course, the vinyl halide commonly used in the industry is the chloride, although others such as bromide and fluoride may be used. Examples of the latter polymers include polyvinyl bromide, polyvinyl fluoride, and copolymers thereof.

The stabilizing composition of the present invention can be added by standard techniques. Thus, it can be added to the solid resin and mixed therein by means of hot rolls or other mixing machines adapted to mix solid resins for molding of the flooring tile or sheets. It can also be dissolved in a suitable solvent and then mixed with the resin, or the solution of the stabilizer can be mixed with a solution of the resin. The most important consideration is that the stabilizer and resin be thoroughly admixed and the dispersion of the stabilizer in the resin be as complete and as rapid as possible.

A preferred stabilizer composition of the present invention is comprised of two components; the first, a mixed barium-zinc or calcium-zinc salt of a higher fatty acid; and the second, a polyhydric alcohol like pentaerythritol (PE). Dipentaerythritol, tripentaerythritol, or mixtures of such polyhydric alcohols with PE may be used. Other polyhydric alcohols, either separately or in combination, such as mannitol or sorbitol with other metal salts may be used. The salt component can also be a barium, calcium, cadmium or zinc salt of a carboxylic acid, advantageously of a $C_8$–$C_{24}$ carbon chain length monocarboxylic acid such as lauric, oleic or stearic acid. Mixed barium/zinc or calcium/zinc salt of such acids, and their preparation are familiar to those skilled in the art to which the present invention pertains.

The compositions of the present invention can include various additional compounds including lubricants for providing the vinyl halide resin with lubricity, and plasticizers of the phthalic ester or fatty acid ester type, hydrocarbon resins or chlorinated olefins or paraffins. Other additives may include auxiliary stabilizers, antioxidants, light stabilizers, pigments, dyes or extenders as disclosed in the above-mentioned U.S. Pat. Nos. 4,269,743 and 4,269,744. Fillers include coarse ground limestone, fine ground limestone, clay (kaolinite), talc or other particulated fillers.

The advantages of this invention and its operating parameters will be further understood with reference to the following detailed examples.

DETAILED OPERATING EXAMPLES

In order to demonstrate the invention, three main base PVC flooring compositions were made having the components of the following table:

TABLE I

|  | A | B | C |
| --- | --- | --- | --- |
| PVC homopolymer | 110 | 55 | — |
| PVC/VA copolymer | — | 55 | 125 |
| Titanium dioxide | 10 | 10 | 10 |
| Ester plasticizer | 55 | 40 | 20 |
| Hydrocarbon resin | 10 | 10 | 10 |
| Coarse ground limestone | 330 | 660 | 660 |
| Fine ground limestone | 160 | 160 | — |
| Clay (kaolinite) | 330 | — | — |
| Talc | — | — | 160 |
| Ba/Zn stearate stabilizer | 2 | 2 | 2 |
| Pentaerythritol (PE) | 1.5 | 1.5 | 1.5 |
| Melamine | 1.5 | 1.5 | 1.5 |
| Benzoic acid | 0.5 | 0.5 | 0.5 |

The flooring compositions were prepared by standard techniques by adding the stabilizers and other additives to the resin and mixing by means of hot rolls or other mixing machines. The base composition of the flooring compositions A, B and C were prepared which included all of the above ingredients from Table I except the barium/zinc stearate (Ba/Zn), pentaerythritol (PE), melamine and benzoic acid. The percentages of water absorption were then determined on each of the base compositions by placing one inch squares of the molded compositions into water for three days at room temperature. Experience has shown that water absorption levels of 2 to 2.5% can be tolerated in practice with no visual damage, at times up to 3% by weight. If, however, water absorption greater than 4% is found according to this test, there is a hazard of flooring damage from incident flooding, and so forth, and absorption levels of more than 5% would be considered intolerable. In this connection, it is well known that the addition of melamine to PVC compositions containing mixed metal and polyhydric alcohol stabilizers provide some improvement in water absorption and may enhance heat or light stability. However, in many cases, this improvement is not sufficient to prevent damage from swelling by water. In addition to the above base compositions, a series of variations were prepared by the addition of separate components of either barium/zinc stearate stabilizer, pentaerythritol, melamine, benzoic acid and combinations thereof, for each of the A, B and C formulations of Table I. These different variations of the base composition ('Base') and the water absorption tests run thereon are reported in Table II.

TABLE II

|  | Water Absorption (%) | | |
| --- | --- | --- | --- |
|  | A | B | C |
| Example 1<br>Base | 3.1 | 2.5 | 1.9 |
| Example 2<br>Base + Ba/Zn | 3.0 | 2.5 | 2.0 |
| Example 3<br>Base + PE | 5.9 | 4.7 | 4.0 |
| Example 4<br>Base + Melamine | 3.1 | 2.5 | 1.9 |
| Example 5<br>Base + Benzoic Acid | 2.9 | 2.4 | 1.8 |
| Example 6<br>Base + Ba/Zn + PE | 6.0 | 4.5 | 3.8 |
| Example 7<br>Base + PE + melamine + Ba/Zn | 5.0 | 3.9 | 3.1 |
| Example 8<br>Base + PE + Ba/Zn + Benzoic Acid | 2.4 | 1.9 | 1.5 |

An analysis of the results of the above experiments provide an understanding of this invention. More specifically, with reference to Example 1, the formulas A-C demonstrate a range of water absorption in the base compositions from very good (C) to marginal (A). Example 2 indicates that no part is played by the mixed metal PVC stabilizer on water absorption inasmuch as the values for water absorption essentially remain the same. Example 3 illustrates the catastrophic increase in water absorption caused by the typical use level of a polyol such as PE. Example 4 indicates that melamine does not improve the water absorption of the base compound. Example 5 illustrates that the addition of benzoic acid is only a trivial improvement. Example 6 confirms that the PVC stabilizer does not improve the poor water absorption characteristics imparted by PE. Example 7 shows that the use of melamine with PE provides only a minor improvement which in many cases would prove wholly unsatisfactory. Example 8 illustrates the practice of this invention and the dramatic improvement caused by the addition of a very minor level of benzoic acid, completely obviating the negative effect of PE in all cases. Most surprisingly, with reference to Examples 1 and 5, Example 8 provides improvement in anti-water absorption beyond the level of even the base compound which did not contain the PE water-absorbing agent. These results are considered to be unobvious. Example 8 also indicates that all of the improvement is attributable to benzoic acid and none to melamine.

The above experiments for benzoic acid were repeated for methylbenzoic (toluic acid) and naphthoic acids as further examples of aromatic monocarboxylic acids. The results are reported hereinafter in Table III as a continuation of Table II.

TABLE III

| | Water Absorption (%) | | |
| --- | --- | --- | --- |
| | A | B | C |
| Example 9 Base + Ba/Zn | 2.9 | 2.8 | 1.8 |
| Example 10 Base + Ba/Zn + PE | 6.1 | 4.8 | 3.7 |
| Example 11 Base + Ba/Zn + PE + Benzoic Acid | 2.6 | 2.3 | 1.9 |
| Example 12 Base + Ba/Zn + PE + Methylbenzoic Acid | 3.0 | 2.7 | 2.0 |
| Example 13 Base + Ba/Zn + PE + Naphthoic Acid | 2.4 | 2.2 | 1.7 |

With reference to Table III, Example 10 illustrates the catastrophic increase in water absorption caused by the typical use level of a polyol such as PE. Example 11 illustrates the practice of this invention and the dramatic improvement caused by the addition of a very minor level of benzoic acid, completely obviating the negative effect of PE in all cases. Again, most surprisingly, with reference to Examples 1, 10, and 11, Example 11 (A+B) provides improvement in anti-water absorption beyond the level of even the base compound which did not contain the PE water-absorbing agent. These results are considered to be unobvious. Furthermore, Example 12 with methylbenzoic acid also indicates remarkable improvement over the base+PE compound of Example 10. Further, Example 13 with naphthoic acid even provides improvement beyond the level of the base, and a little better than benzoic acid.

The above data demonstrates that minor amounts of an aromatic monocarboxylic acid, such as benzoic, methylbenzoic, and naphthoic acids, will reverse the increase in absorption of water caused by polyhydric alcohols in filled plasticized PVC compositions. Furthermore, such acids as benzoic and naphthoic will even yield lower moisture absorption than in the complete absence of such alcohols. This is a dramatic effect and accompanies addition of much less aromatic acid than would be needed to stoichiometrically react with the alcohol, if one were to postulate that as the expected reaction. Therefore, this invention is considered to produce highly unexpected and unobvious results.

Having described this invention, its advantages and operating parameters, it will become obvious to persons of ordinary skill in the art in view of the above description that variations thereof may be made without departing from the spirit and scope thereof.

What is claimed is:

1. A vinyl halide resin flooring composition having reduced water absorption consisting essentially of a vinyl halide resin, a polyhydric alcohol, a metal salt stabilizer which is a metal salt from the group consisting of calcium, zinc, barium and cadmium salts of a higher fatty acid or mixtures thereof, a filler and an aromatic monocarboxylic acid as an anti-water absorption agent in an effective amount.

2. The composition according to claim 1 wherein the polyhydric alcohol contains pentaerythritol, the metal stabilizer is a metal salt from the group consisting of calcium, zinc, barium and cadmium salt of a higher fatty acid or mixtures thereof, and the aromatic carboxylic acid is methylbenzoic acid or naphthoic acid.

3. A vinyl halide resin flooring composition having reduced water absorption consisting essentially of a polymer or copolymer of vinyl chloride, a polyhydric alcohol selected from the group consisting of pentaerythritol, dipentaerythritol, tripentaerythritol, mannitol, sorbitol and mixtures thereof, a metal salt of a higher fatty acid selected from the group consisting of calcium, zinc, barium, cadmium, and mixtures of said metal salts, a filler containing calcium carbonate and an aromatic monocarboxylic acid as an anti-water absorption agent in an effective amount.

4. The composition of claim 3 wherein said polyhydric alcohol is present in an amount from about 0.5 to about 5 parts, said metal salt stabilizer is present in an amount from about 0.75 to about 5 parts, said filler is present in an amount from about 300 to about 1000 parts, said aromatic monocarboxylic acid is methylbenzoic acid or naphthoic acid and is present in an amount from about 0.2 to about 5 parts and said polymer is present in an amount of about 100 parts.

5. The composition of claim 4 which additionally contains a plasticizer up to about 100 parts and about 0.2 to about 5 parts melamine.

6. The composition of claim 4 wherein the polyhydric alcohol contains pentaerythritol.

7. A molded floor tile or sheet produced from the composition of claim 1.

8. A molded floor tile or sheet produced from the composition of claim 3.

9. A molded floor tile or sheet produced from the composition of claim 4.

* * * * *